United States Patent
Brydon et al.

(10) Patent No.: US 7,356,556 B2
(45) Date of Patent: *Apr. 8, 2008

(54) SYSTEM AND METHOD FOR SELECTING INTERNET MEDIA CHANNELS

(75) Inventors: Robert B. Brydon, Sunnyvale, CA (US); Diane E. Barram, Palo Alto, CA (US); Phong H. Le, Oakland, CA (US); Son N. Doan, San Jose, CA (US); Wilburt J. Labio, Sunnyvale, CA (US)

(73) Assignee: Napster, Inc., Santa Clara, CA (US)

( * ) Notice: Subject to any disclaimer, the term of this patent is extended or adjusted under 35 U.S.C. 154(b) by 451 days.

This patent is subject to a terminal disclaimer.

(21) Appl. No.: 11/048,256

(22) Filed: Jan. 31, 2005

(65) Prior Publication Data

US 2005/0131731 A1    Jun. 16, 2005

Related U.S. Application Data

(62) Division of application No. 09/573,686, filed on May 19, 2000, now Pat. No. 6,865,600.

(51) Int. Cl.
    G06F 15/16    (2006.01)
(52) U.S. Cl. ...................... 709/200; 709/223
(58) Field of Classification Search ........ 709/200–203, 709/217–227; 707/3, 6–7, 9–10, 100–102
    See application file for complete search history.

(56) References Cited

U.S. PATENT DOCUMENTS

| | | | | |
|---|---|---|---|---|
| 6,006,223 A | * | 12/1999 | Agrawal et al. | 707/5 |
| 6,038,560 A | * | 3/2000 | Wical | 707/5 |
| 6,212,494 B1 | * | 4/2001 | Boguraev | 704/9 |
| 6,233,575 B1 | * | 5/2001 | Agrawal et al. | 707/6 |
| 6,248,946 B1 | * | 6/2001 | Dwek | 84/609 |
| 6,308,172 B1 | * | 10/2001 | Agrawal et al. | 707/5 |
| 6,381,314 B1 | * | 4/2002 | Walinski | 379/101.01 |
| 6,434,621 B1 | * | 8/2002 | Pezzillo et al. | 709/231 |
| 6,445,306 B1 | * | 9/2002 | Trovato et al. | 340/825.24 |
| 6,446,130 B1 | * | 9/2002 | Grapes | 709/231 |
| 6,650,877 B1 | * | 11/2003 | Tarbouriech et al. | 455/186.1 |
| 6,674,993 B1 | * | 1/2004 | Tarbouriech | 455/2.01 |
| 6,865,600 B1 | * | 3/2005 | Brydon et al. | 709/219 |

* cited by examiner

Primary Examiner—Moustafa Meky
(74) Attorney, Agent, or Firm—Martine Penilla & Gencarella, LLP

(57) ABSTRACT

A system and method provide for selecting Internet media channels. Generally speaking, the selection involves choosing target channels based on user preferences. In one example embodiment, the system and method receive a user preference relating to a data item available from at least one of a plurality of media providers, augment the user preference with at least one additional preference that is related to the user preference, and select one or more media providers from the plurality of media providers, wherein the selection is based on the frequency with which the selected media provider provides the user preference or the augmenting additional preference.

20 Claims, 6 Drawing Sheets

SYSTEM AND METHOD FOR SELECTING INTERNET MEDIA CHANNELS

CROSS-REFERENCE TO RELATED APPLICATION

This application is a divisional of U.S. application Ser. No. 09/573,686, filed May 19, 2000, now U.S. Pat. No. 6,865,600 the disclosure of which is incorporated herein by reference.

BACKGROUND

1. Field of the Invention

The present invention relates generally to Internet search engines and more particularly to selecting Internet media channels based on augmented user preferences.

2. Related Art

The Internet has dramatically changed the manner in which we access, gather, and collect information. On-line users are able to access all types of information using the Internet, including various types of streaming media such as audio and video. For example, many hundreds or even thousands of radio stations now broadcast their programming over the Internet in addition to over the air.

Users can benefit from this great variety of programming, particularly if efficient tools are available for locating a station that suits the user's individual tastes. Various conventional Internet search engines can be used to search for Internet radio broadcasts, referred to herein as channels, based on one or more search terms in the same manner that one would search for other data items on the web. For example, a user can initiate a search based on an artist's name or a song title. If either of these search terms appear on a web page associated with a radio station's web site, this will result in a "hit".

Conventional search engines do not provide a very robust search, particularly since search engines depend upon the existence of the requested data item on a web page. A user interested in finding stations that play a particular obscure artist may not receive hits for many of the stations that actually do play the artist, because the artist's name is not found on those stations' web pages. Also, the results of a conventional search engine search will not rank the search results according to the frequency with which the search terms are actually played by the radio station. Users may therefore find it difficult to find those radio stations that are best suited to their tastes.

What is needed is an improved system and method for selecting Internet media channels, and Internet radio stations in particular, based on user preferences.

SUMMARY OF THE INVENTION

The present invention provides a system and method for selecting Internet media channels. Generally speaking, the present invention selects target channels based on user preferences. An example embodiment of the present invention is directed to a system and method including receiving a user preference relating to a data item available from at least one of a plurality of media providers, augmenting the user preference with at least one additional preference that is related to the user preference, and selecting one or more media providers from the plurality of media providers, wherein the selection is based on the frequency with which the selected media provider provides the user preference or the augmenting additional preference.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

The present invention provides a system and method for selecting Internet media channels. Generally speaking, the present invention selects target channels based on user preferences. An example embodiment of the present invention is directed to a system and method including receiving a user preference relating to a data item available from at least one of a plurality of media providers, augmenting the user preference with at least one additional preference that is related to the user preference, and selecting one or more media providers from the plurality of media providers, wherein the selection is based on the frequency with which the selected media provider provides the user preference or the augmenting additional preference.

Figure 1:
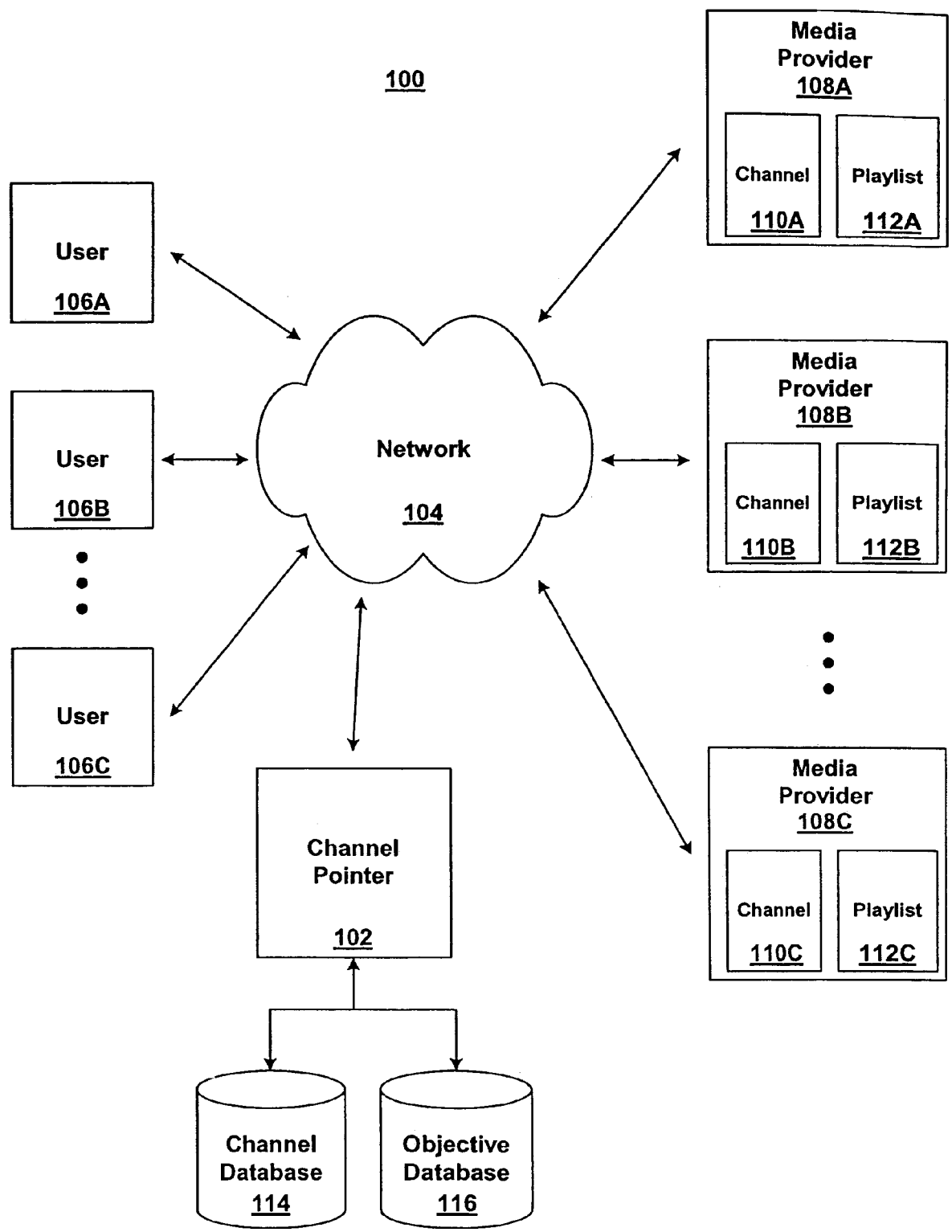
FIG. 1 depicts a network computing environment within which an example embodiment of the present invention operates.

FIG. 1 illustrates a network computing environment 100 within which an example embodiment of the present invention operates, including a network 104 that is accessed by one or more users 106 (shown as 106A, 106B, and 106C). Network 104 is also accessed by one or more media providers 108 (shown as 108A, 108B, and 108C) that provide a media channel 110 (shown as 110A, 110B, and 110C, respectively) to users 106 via network 104. A playlist 112 (shown as 112A, 112B, and 112C) is also associated with each media provider 108. According to an example embodiment of the present invention, a channel pointer 102 selects one or more target channels from the available channels 110 based on user preferences provided by users 106, thereby allowing users 106 to access target channels that are suited to the individual user's tastes. Users 106 interact with channel pointer 102 using a conventional graphical user interface (GUI) (not shown) provided by channel pointer 102. Channel pointer 102 can use data from a channel database 114 and an objective database 116. The operation of channel pointer 102 is described in greater detail below according to many example embodiments of the present invention. Channel pointer 102 can be implemented as one or more lines of computer code using any appropriate programming language.

The present invention can be applied to many different applications wherein users 106 wish to select a media channel 110 available over network 104 based on user preferences. According to an example embodiment of the present invention, media provider 108 can represent any provider of streaming audio represented by channel 110. For example, media provider 108 can represent a traditional radio station that broadcasts its over-the-air radio programming (represented by channel 110) over network 104. Alternatively, the media provider could be an Internet-only source of audio data. Furthermore, though the present invention is described below in terms of this example radio embodiment, the principles described herein can also be applied to many applications involving other types of streaming media, such as video or audio/video. For example, channel pointer 102 can be used to select one or more audio/video channels based on user preferences appropriate to audio/video media.

Playlist 112 represents information related to the programming of the corresponding channel 110. For the example radio channel application, playlist 112 can represent artist names and song titles that are played on channel 110. Playlist 112 can represent information that is already compiled related to channel programming over a particular time period. For example, playlist 112 can represent a list of artists and songs played by a radio station for the previous day. As a second example, playlist 112 can represent a sample list of artists and songs that are commonly played by a radio station. Alternatively, playlist 112 can represent a stream of information. For example, playlist 112 can represent the real-time indication by a radio station on their web site of "what's currently playing". Channel pointer 102 can monitor and compile this stream of information as needed into a list of artists and songs, or it can assemble a list based on the non-real time examples of playlist 112.

Network 104 can represent any network, or two or more interconnected networks, that provides a communications pathway between users 106, media providers 108, and channel pointer 102. For example, network 104 can represent the Internet. Alternatively, network 104 can represent a wireless telecommunications network interconnected with the Internet, whereby users 106 employing mobile handheld devices access channel pointer 102 and media providers 108 via a wireless connection.

Channel database 114 can represent any database (or multiple databases) that contains data related to media providers 108. Channel database 114 is described in greater detail below. Objective database 116 can represent any database (or multiple databases) that contains objective data related to the program content of the various channels 110. Objective database 116 is preferably implemented as described in co-pending U.S. patent application, Ser. No. 09/574,108, entitled "System and Method for Determining Affinity Using Objective and Subjective Data," which is incorporated herein by reference. For the example radio channel application, objective database 116 can include objective properties that can be used to describe artists and songs, such as by name or title (e.g., Jane Doe or "Song Title"), genre (e.g., rock, country, jazz), era (e.g., 1970's, big band), tempo (e.g., slow, fast), and popularity (e.g., number of albums sold, number of concert tickets sold). Other objective properties can include, but are not limited to, release date, length, energy, edginess, mood, imagery, and topic. Each property is preferably described as a quantitative value, though according to an alternative example embodiment properties can be described using textual descriptors. The use of the objective data stored in objective database 116 is described in greater detail below.

Figure 2:
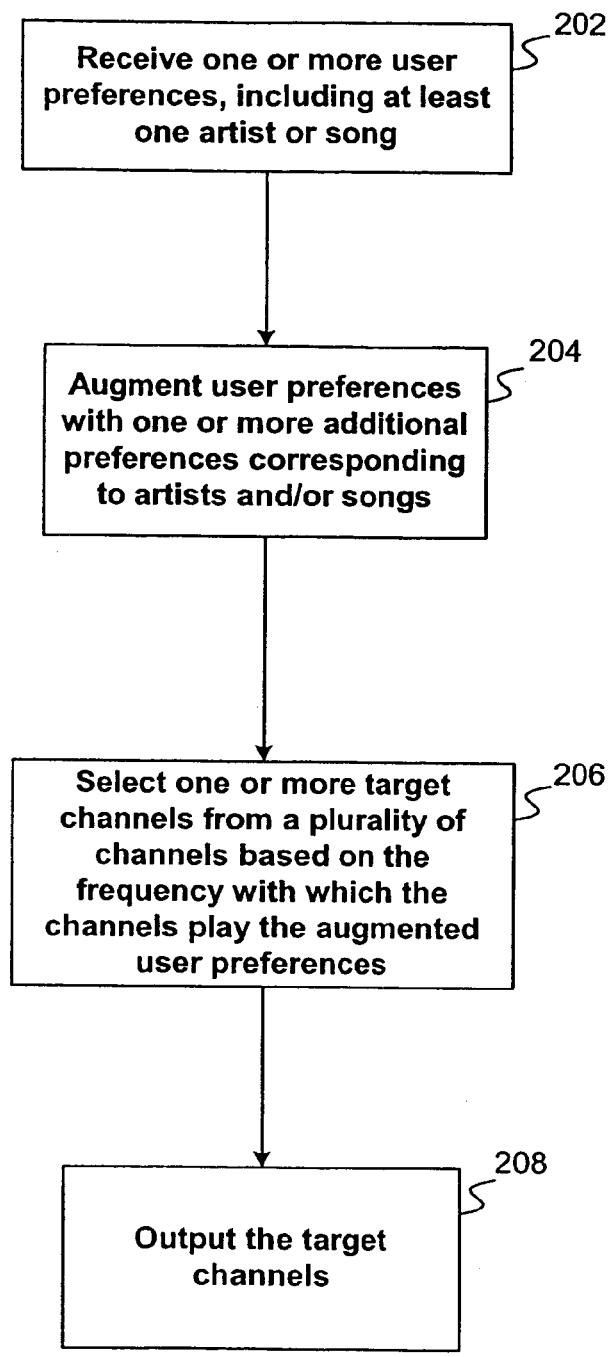
FIG. 2 is a flowchart that describes selecting target channels based on augmented user preferences according to an example embodiment of the present invention.

FIG. 2 is a flowchart that describes the operation of channel pointer 102 in selecting target channels based on augmented user preferences according to an example embodiment of the present invention. In operation 202, one or more user preferences are received by channel pointer 102, including at least the name of an artist or the title of a song. User preferences can represent any data that indicates a particular user's tastes related to the provided media, including, but not limited to, artist names and song titles. User preferences can also include objective properties as described above with respect to objective database 116 that indicate a user's tastes. For example, a user might describe his tastes by four favorite songs, five favorite artists, two favorite genres, and a desired average tempo.

Figure 3:
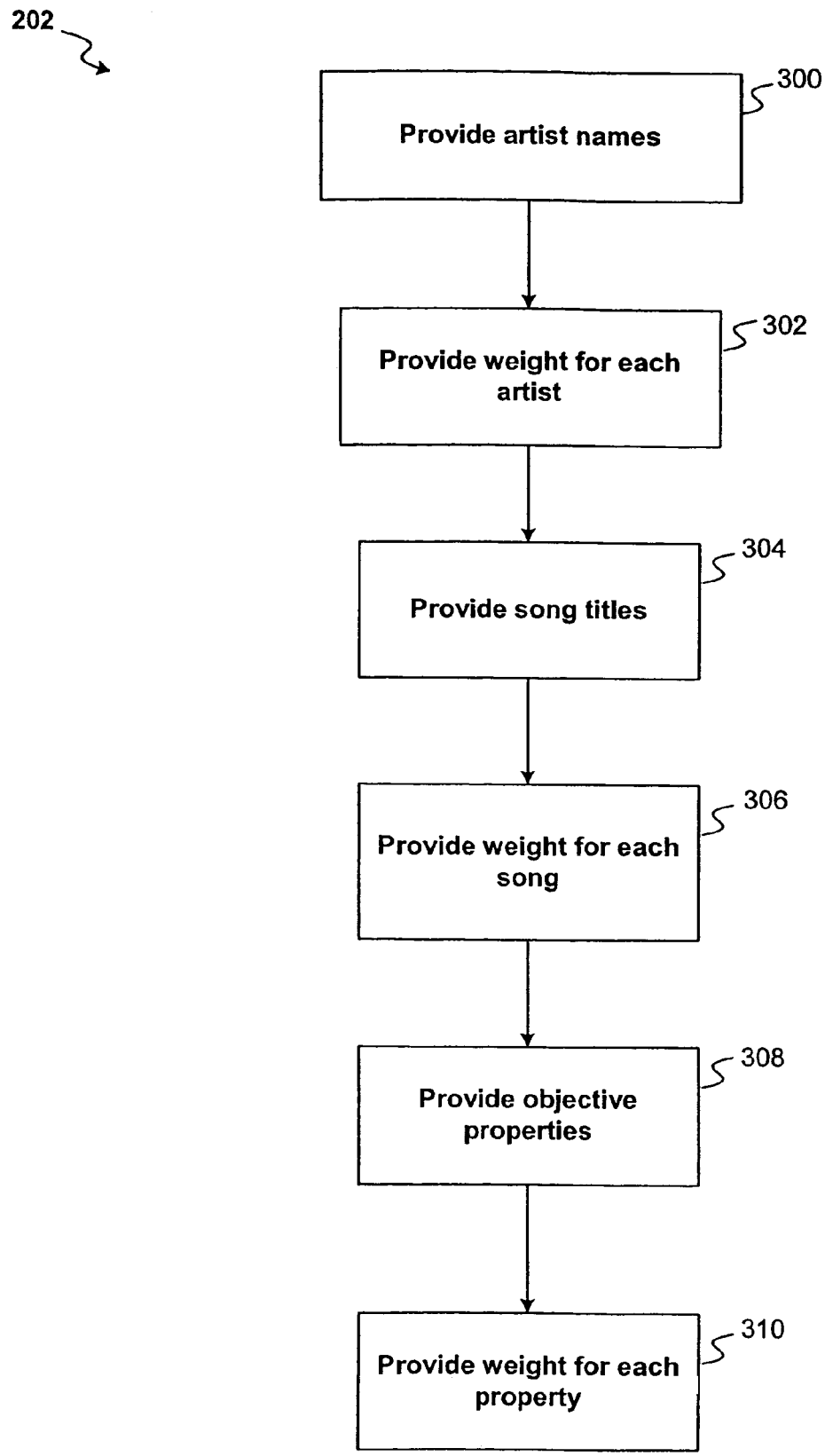
FIG. 3 is a flowchart that describes in greater detail receiving user preferences according to an example embodiment of the present invention.

FIG. 3 is a flowchart that describes operation 202 in greater detail according to an example embodiment of the present invention. In operation 300, a user 106 can provide artists' names that are indicative of the user's tastes, either in a positive (i.e., the user wishes to hear a particular artist) or negative (i.e., the user wishes not to hear a particular artist) sense. In operation 302, the user can indicate a weighting to be applied to each artist relative to the other artists provided in operation 300. According to an example embodiment of the present invention, a slider bar (not shown) is presented for each artist within the channel pointer's GUI. Sliding the bar to one end indicates that the userwishes to hear that artist, sliding the bar to the other end indicates that the user wishes not to hear that artist, with positions in-between either end indicating a relative like or dislike for that particular artist depending upon the proximity to either end. The user need not provide a weighting for one or more of the artists. In such a case, the artists are preferably weighted equally and in a positive sense.

Similarly, in operations 304 and 306, a user 106 can provide song titles that are indicative of the user's tastes, as well as a weighting to be applied to each song relative to the other songs provided by the user. According to an example embodiment of the present invention, a user should at least provide an artist name in operation 300 or a song title in operation 304, though two or more of either or both artists and songs can be provided. Operations 302 and 306 are clearly optional and the system can assign weights according to a predetermined protocol when the user does not prescribe weights.

In operations 308 and 310, a user 106 can provide objective properties that are indicative of the user's tastes, and indicate a weighting to be applied to each property relative to the other properties provided by the user. For example, a user can indicate a strong preference for a genre, a medium preference for an era, and a weak preference for popularity. Entering objective properties (and their associated weightings) are optional in the sense that this information is not necessary to the operation of the invention, though, in general, providing more information will result in channels being selected that better reflect the user's tastes.

Returning to FIG. 2, in operation 204 the user preferences provided by the user in operation 202 are augmented with one or more additional preferences similar to one or more of the artists and/or songs. For example, if a user provides the name of Artist1 in operation 202, Artist2, Artist3, and Artist4 could be added to the user's preferences, where Artist2, Artist3, and Artist4 are similar in some respect to Artist1. Augmenting user preferences can provide for a more robust selection of channels. In the example previously mentioned, many channels that would otherwise fit the tastes of the user and that play artists similar to Artist1 might not be selected solely on the basis of Artist1 if Artist1 isn't played (or hasn't been played lately). In this case, channels may be selected that play Artist2, Artist3, and Artist4.

Figure 4:
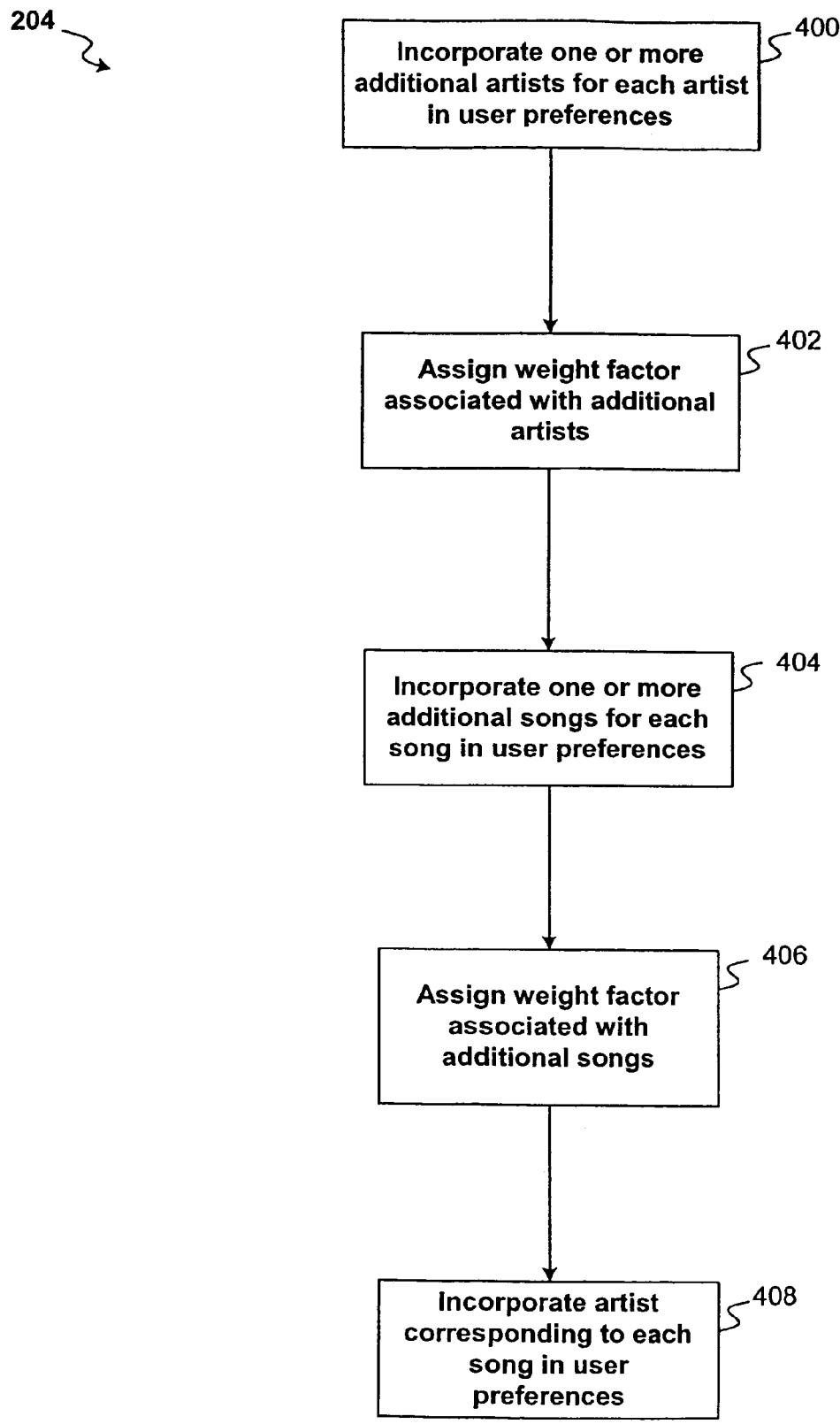
FIG. 4 is a flowchart that describes in greater detail augmenting user preferences according to an example embodiment of the present invention.

FIG. 4 is a flowchart that describes operation 204 in greater detail according to an example embodiment of the present invention. In operation 400, one or more additional artists are incorporated into the user preferences for each artist provided by the user in operation 202. As described above, additional artists are chosen that are similar in some respect to the artist provided by the user. According to an example embodiment of the present invention, additional artists are chosen based on their affinity relationship with the user provided artist, where the affinity relationship is preferably calculated as described in U.S. Patent Application entitled "System and Method for Determining Affinity Using Objective and Subjective Data," incorporated by reference above. The number of additional artists to add can be fixed or varied according to a variety of factors, including, but not limited to, the needs of a particular application and the number of other artists provided by the user.

In operation 402, a weighting is assigned to each additional artist based on the weighting provided by the user for that artist in operation 302. According to an example embodiment, the weighting assigned to additional artists is a fixed percentage (e.g., 15%) of the weighting given to the user-provided artist. In the example previously mentioned, if the user provides a weighting of X to Artist1, a weighting of 0.15X, for example, can be assigned to Artist2, Artist3, and Artist4.

Similarly, in operations 404 and 406 one or more additional songs are incorporated into the user preferences for each song provided by the user in operation 202, with a weighting assigned to each based on the weighting of the user-provided song. As with the artists, similar songs are preferably calculated as described in U.S. Patent Application entitled "System and Method for Determining Affinity Using Objective and Subjective Data," incorporated by reference above.

In operation 408, the artist corresponding to each song in the augmented user preferences is also incorporated into the preferences. This information is available from objective database 116, which contains song titles and their corresponding artist names. These artist names can be assigned a weighting based on the user-provided song weighting. Incorporating these artist names into the user preferences can make the selection more robust, as it is assumed that the user might be interested in other songs performed by the artist.

When augmenting user preferences as described above with respect to operations 400 through 408, it is possible that multiple instances of the same artist or song can be added to the user preferences. As described below, channels can be selected based on a weighted linear combination of scores indexed by the user preferences. Including multiple instances of the same artist or song has the effect of reinforcing those preferences that are similar to one another, because the contribution of the duplicate preferences are additive. Consider the following illustrative example. A user provides Artist1, Artist4, Song1, and Genre1 as preferences. These user preferences are augmented with Artist2, Artist3, and Artist4 (similar to Artist1), Song2, Song3 (similar to Song1), and the artists of Song1, Song2, and Song3, which happen to be Artist1, Artist 4, and Artist5. The augmented user preferences now contain, for example, three instances of Artist4 (each potentially having a different weighting). Each instance contributes to the channel scores, which increases the importance of Artist4 in the overall selection process.

Returning to FIG. 2, in operation 206 one or more target channels are selected from a plurality of available channels 110. According to an example embodiment of the present invention, this selection is based on the frequency with which channels 110 play the augmented user preferences. In the previously described illustrative example, channels which frequently play Artist1, Artist4, Song1, and artists and songs within Genre1, as well as the augmented preferences, are more likely to be selected. Target channels can be selected from all available channels 110, though if the number of providers becomes very large, a subset of channels 110 can be selected from.

Figure 5:
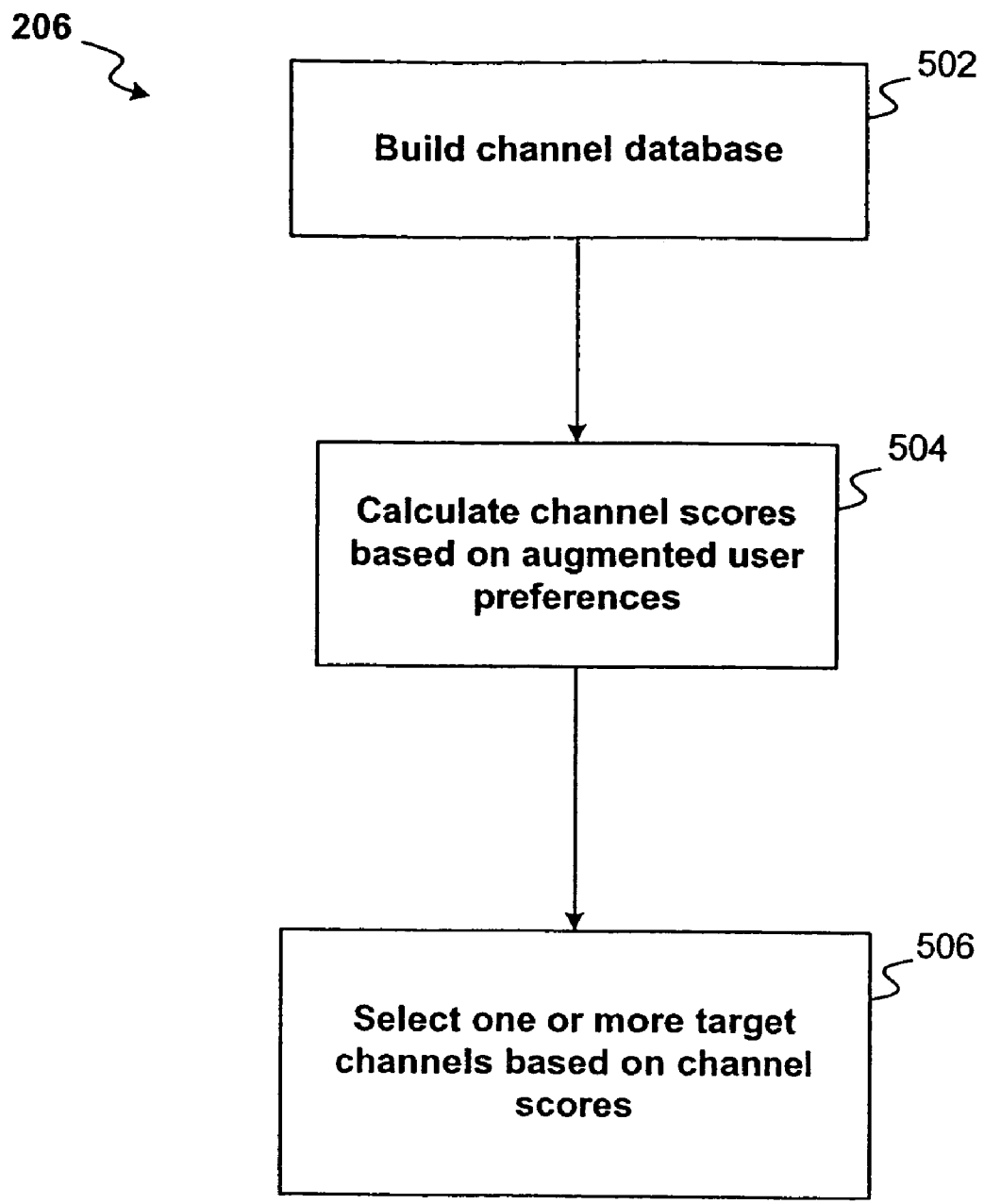
FIG. 5 is a flowchart that describes in greater detail selecting target channels based on the frequency with which the channels play the augmented user preferences according to an example embodiment of the present invention.

FIG. 5 is a flowchart that describes operation 206 in greater detail according to an example embodiment of the present invention. In operation 502, channel database 114 is built. Channel database 502 includes data related to the programming or media provided by channels 110. For the example radio channel application, channel database 502 can include data indicating the frequency with which particular artists and songs are played on channels 110. For example, channel database 502 could include data indicating that Aritist1 is played by channel 110A an average of five times out of every 1000 songs. Channel database 502 can also include data indicating the frequency with which the songs and artists played on channels 110 have various objective properties. For example, channel database 502 could include data indicating that 450 out of every 1000 songs are within the country music genre. According to an example embodiment of the present invention, channel database 114 need only be built once and then updated periodically as new information related to channels 110 becomes available.

Figure 6:
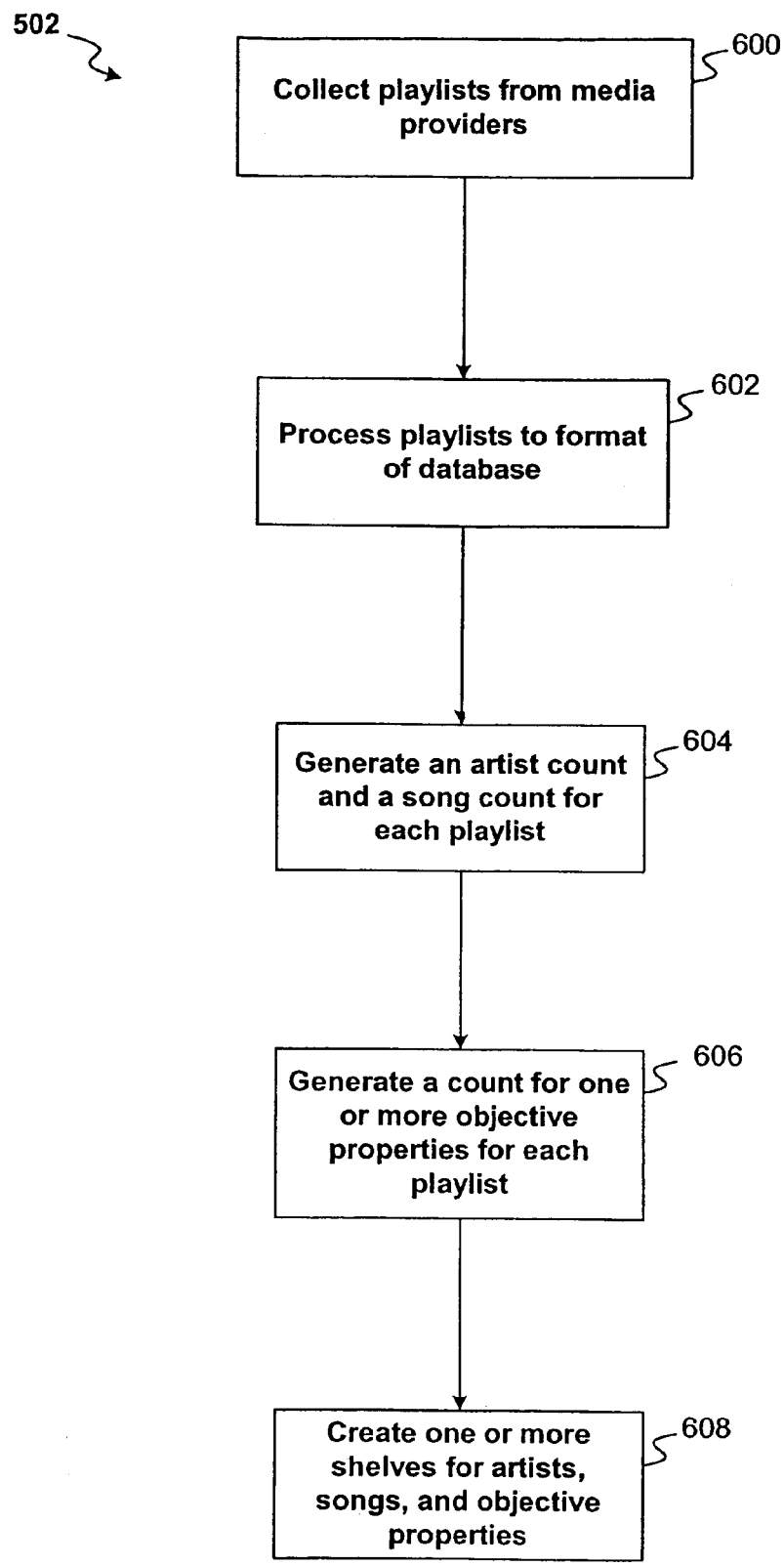
FIG. 6 is a flowchart that describes in greater detail building a channel database according to an example embodiment of the present invention.

FIG. 6 is a flowchart that describes operation 502 in greater detail according to an example embodiment of the present invention. In operation 600, playlists 112 are collected from media providers 108. As described above, playlists 112 can contain a list of artists and songs that are played by a particular channel 110. In operation 602, the data contained in the playlists is processed so that, for example, the artist names and song titles conform to a format expected by channel database 114. As another example, data that may not be stored in channel database 114 (e.g., time stamps corresponding to when a song or artist is played) will not be captured from the playlists or is stripped away before information is stored in the channel database.

In operation 604, an artist count and a song count are generated for each playlist 112. The artist count and song count indicate the frequency with which particular artists and songs, respectively, are played on the channel corresponding to the playlist. According to an example embodiment of the present invention, the artist count is formed by counting the number of times each artist appears in a particular playlist. Similarly, the song count is formed by counting the number of times each song appears in a particular playlist. The artist and song counts are then normalized so that the count indicates how many times the particular song or artists is played for every Y songs played on the channel corresponding to the playlist, where a constant Y is used to process all playlists. For example, the artist and song counts can be normalized to reflect the number of times an artist or song is played for every 1000 songs played on the channel, so that if Artist1 is listed 500 times in a playlist of 2000 songs, the normalized artist count for Artist1 would be 250 (i.e., Artist1 was played an average of 250 times for every 1000 songs).

In operation 606, a count is derived for one or more objective properties. An objective property count indicates the frequency with which objective properties are exhibited by the songs and/or artists played on a particular channel 110. According to an example embodiment of the present invention, these counts are derived by counting the number of songs in a playlist that conform to a particular property. For example, a count for the country genre could be generated by determining the number of country songs that were played on that channel. The information provided by playlists 112 will in many cases need to be supplemented with data from objective database 116, because most playlists 112 provide artist name and song title but do not provide other objective data. These counts can also be normalized to reflect the number of occurrences per Y songs.

In operation 608, one or more database tables are created for artists, songs, and objective properties using the artist counts, song counts, and objective property counts associated with the available playlists 112. These one or more tables form channel database 114. As used herein, tables refer to a set of tuples, wherein each tuple is a list of string data. Tables are typically on disk for persistence. According to an example embodiment of the present invention, a first table is created to store artist data, a second table is created to store song data, and a third table is created to store objective data. Each table is indexed by the individual items within the object type. For example, the artist table is indexed by artist name (e.g., Artist1, Artist2, . . . ), the song table is indexed by song title (e.g., Song1, Song2, . . . ), and the objective data table is indexed by objective data type (e.g., Genre1, Genre2, . . . , Era1, Era2, . . . ). For each entry in the table, those channels 110 that play that particular entry are listed along with the frequency at which the entry is played. For example, the Artist1 entry in the artist table can have associated with the entry one or more channels 110 that play Artist1, along with the frequency with which Artist1 is played (e.g., Artist 1: channel 1-15 out of every 1000 songs, channel 2-27 out of every 1000 songs, . . . ).

Returning to FIG. 5, in operation 504 a score is calculated for each channel (within the set of those channels 110 being considered) based on the augmented user preferences. According to an example embodiment of the present invention, channel scores are calculated by looking up each user preference in the appropriate table to find those channels that play the particular preference, multiplying the frequency by the weighting associated with the preference for each channel, and then accumulating these weighted frequencies for each channel to generate a score.

Consider the following illustrative example. A score is to be generated for Channel 1 using augmented user preferences that include Artist1 (weighting 0.5), Artist2 (weighting 0.25), and Genre1 (weighting 0.02). Looking up Artist1 in the artist table, Channel1 plays Artist1 with a frequency of 20 times every 1000 songs, giving a weighted frequency of 10 (per 1000 songs). Channel1 plays Artist2 with a frequency of 16 times every 1000 songs, giving a weighted frequency of 4 (per 1000 songs). Looking up Genre1 in the objective property table, Channel1 plays songs of Genre1 with a frequency of 600 times every 1000 songs, giving a weighted frequency of 12 (per 1000 songs). Channel1 therefore has a total score of 26 (10+4+12). Scores for other channels 110 can be calculated in a similar manner. Those skilled in the art will recognize that more efficient techniques are available for calculating channel scores given the database tables, and that the preceding example was meant for illustrative purposes only.

In operation 506, one or more target channels are selected based on the channel scores calculated in operation 504. According to an example embodiment of the present invention, these target channels are presented to the user so that the user may then establish a connection to any of the target channels via network 104 in order to receive the desired channel 110 programming. For example, a user 112 enters one or more user preferences using the channel pointer's GUI. Channel pointer 102 determines the one or more target channels, and then presents to the user a hyperlink to the one or more target channels.

The methods and apparatuses of the present invention provide a robust searching capability by augmenting a user defined target search data using user defined preferences and objective data having some predetermined relationship to the user defined target search data. This can assist a user searching for information related to various media so long as an objective database is provided that captures relationships between data items in those media.

While the present invention has been described in terms of a preferred embodiment, other embodiments and variations are within the scope of the following claims.

The invention claimed is:

1. A method of selecting one or more internet media channels from a plurality of internet media channels, the method comprising:
   a. receiving a first data item from a user through the user's computer;
   b. incorporating one or more second data items with the first data item, wherein the one or more second data items have an affinity relationship with the first data item;
   c. determining a first frequency value based on how often each internet media channel in the plurality plays the first data item in a predetermined period of time;
   d. determining a second frequency value based on how often each internet media channel in the plurality plays each of the one or more second data items in the predetermined period of time;
   e. calculating a channel score for each internet media channel, wherein the channel score is calculated by summing the first frequency value and the second frequency value; and
   f. selecting one or more internet media channels based on the channel score within a predefined range.

2. The method according to claim 1 further comprising
   a. collecting a playlist corresponding to each internet media provider, wherein the playlist includes programming characteristics of the corresponding internet media provider; and
   b. storing the playlist in a channel database, wherein the playlist is configured in a format such that the first frequency value and the second frequency value can be determined.

3. The method according to claim 2 further comprising updating the channel base when new data pertaining to the internet media channel is available.

4. The method according to claim 1 further comprising multiplying the first frequency value with a first weighting value, wherein the weighted first frequency value is used to calculate the channel score.

5. The method according to claim 1 further comprising multiplying the second frequency value with a second weighting value, wherein the weighted second frequency value is used to calculate the channel score.

6. The method according to claim 1 further comprising normalizing the first frequency value and the second frequency value.

7. The method according to claim 1 wherein the first data item includes one or more first properties, further wherein the one or more first properties are weighted by a predetermined value.

8. The method according to claim 7 wherein the one or more second data items incorporated is selected from a group consisting of a song name, an artist name, a genre, an era and a tempo which is associated with the first data item.

9. The method according to claim 1 wherein the one or more second data items include one or more second properties, further wherein the one or more second properties are weighted by a predetermined value.

10. The method according to claim 1 wherein the first data item is selected from a group consisting of a song name, an artist name, a genre, an era and a tempo.

11. The method according to claim 1 wherein the first data item is one or more objective properties.

12. The method according to claim 1 wherein the one or more second data items is an objective property.

13. The method according to claim 1 wherein the one or more second data items are stored in an objective database.

14. A method for selecting internet media channels, comprising method operations of:
    determining a first frequency for a first user preference, the first frequency being a number of times an internet media channel provides the first user preference;
    multiplying the first frequency by a first weighing associated with the first user preference, the multiplication defining a first weighted frequency; and
    selecting the internet media channel based on the first weighted frequency.

15. The method of claim 14, further comprising:
    determining a second frequency for a second user preference, the second frequency being a number of times the internet media channel provides the second user preference;
    multiplying the second frequency by a second weighing associated with the second user preference, the multiplication defining a second weighted frequency; and
    accumulating the first and second weighted frequencies to generate a channel score; and
    selecting the internet media channel based on the channel score.

16. The method of claim 15, further comprising:
    normalizing the first and second frequencies.

17. The method of claim 14, wherein the method operation of determining the first frequency for the first user preference includes:
    counting the number of times the first user preference appears in a playlist.

18. A method for selecting internet media channels, comprising method operations of:
    determining a frequency for each of a plurality of user preferences, the frequency being a number of times each of the internet media channels provides each of the plurality of user preferences;
    calculating a channel score for each of the internet media channels based on the frequency determined for each of the plurality of user preferences; and
    selecting one or more of the internet media channels based on the channel score.

19. The method of claim 18, wherein the method operation of calculating the channel score for each of the internet media channels include:
    adding the frequency of each of the plurality of user preferences together to generate the channel score.

20. The method of claim 18, wherein the method operation of calculating the channel score for each of the internet media channels include:
    multiplying the frequency of each of the plurality of user preferences by a weighing associated with each of the plurality of user preferences, the multiplication defining a weighed frequency; and
    adding the weighted frequency of each of the plurality of user preferences together to generate the channel score.

* * * * *